UNITED STATES PATENT OFFICE.

CARL OSCAR MÜLLER, OF BASLE, SWITZERLAND, ASSIGNOR TO BASLE CHEMICAL WORKS BINDSCHEDLER, OF SAME PLACE.

RHODAMIN DYE.

SPECIFICATION forming part of Letters Patent No. 576,223, dated February 2, 1897.

Application filed June 30, 1896. Serial No. 597,644. (Specimens.) Patented in France March 6, 1895, No. 245,593, and in England March 8, 1895, No. 4,985.

*To all whom it may concern:*

Be it known that I, CARL OSCAR MÜLLER, chemist, a subject of the Emperor of Germany, residing at Basle, Switzerland, have invented certain Improvements in the Manufacture of Rhodamin Dyes, (which have been patented in France by Letters Patent No. 245,593, dated March 6, 1895, and in England by Letters Patent No. 4,985, dated March 8, 1895,) of which the following is a clear and complete specification.

The unsymmetrical rhodamin dyestuffs obtained by the condensation of one molecule of the new dialkylamidoöxybenzoyl-benzoic acid, which are fully described in another application, Serial No. 597,642, filed June 30, 1896, for Letters Patent of the inventor, with one molecule metaämidophenol or of its alkyl derivatives, can easily be transformed into the corresponding alkyl ethers by heating their alcoholic solution charged with hydrochloric acid. These ethers which constitute new valuable coloring-matters have probably the following constitutional formula:

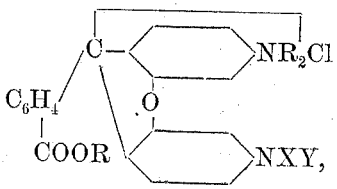

where R stands for alkyl residues or alkyl groups and X and Y for hydrogen or alkyl groups.

Example: Fourteen kilograms of dimethylamidoöxybenzoyl-benzoic acid obtained by the condensation of one molecule dimethylmetaamidophenol with one molecule anhydrous-phtalic acid, and ten kilograms diethylmetaamidophenol are dissolved in seventy kilograms sulfuric acid of about ninety-eight per cent., ($H_2SO_4$.) The solution is heated to about 110° centigrade until a test gives a clear solution in water. Then it is poured into about eight hundred liters of water and boiled. The crystallized product of reaction is precipitated and purified by recrystallization. On heating an alcoholic solution of this new unsymmetrical dimethyldiethyl rhodamin, which is charged with hydrochloric acid, the body is transformed into a new coloring-matter, dyeing cotton, silk, and wool in a fine blue-red tint. This new coloring-matter is obtained as follows: Ten kilograms of the unsymmetrical dimethyldiethyl rhodamin are boiled together with one hundred liters methylalcohol or ethylalcohol, which is saturated with gaseous hydrochloric acid during about eight hours in a closed vessel provided with retrograding cooler. The alcohol is distilled off and the remaining residue, which forms the new coloring-matter, is completely dried. It constitutes a green powder with metallic luster, which dissolves in concentrated sulfuric acid with yellow coloration. In water and alcohol it dissolves with splendid red coloration.

The dyestuff base is soluble in alcohol and ether.

The dyestuff has probably the following constitutional formula:

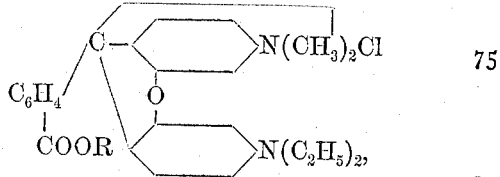

where R stands for an alkyl group or alkyl rest.

This dyestuff can also be produced by etherifying the product of condensation of one molecule diethylamidoöxybenzoyl-benzoic acid with one molecule dimethylmetaämidophenol.

What I claim as my invention, and wish to secure by Letters Patent, is—

1. The improvement in the manufacture of rhodamin dyes, consisting in the production of an alkylester of the unsymmetrical coloring-matter resulting from the condensation of one molecule of a dialkylamidoöxybenzoyl-benzoic acid with one molecule of metaamidophenol or of its alkyl derivatives, by boiling this coloring-matter with alcohol and hydrochloric acid, as described.

2. The improvement in the manufacture of rhodamin dyes, consisting in the production of an alkylester of the dimethyldiethyl rhodamin resulting from the condensation of one molecule of dimethylamidoöxybenzoyl-benzoic acid with one molecule diethylmetaämidophenol, by boiling this rhodamin with alcohol and hydrochloric acid, as described.

3. As a new article of manufacture, the described alkylester of the unsymmetrical dimethyldiethyl rhodamin, which constitutes a green powder with metallic luster, dyes cotton, silk and wool in a blue red, dissolves in concentrated sulfuric acid with yellow coloration and in water, alcohol and ether with splendid red coloration.

In witness whereof I have hereunto signed my name in the presence of two subscribing witnesses.

CARL OSCAR MÜLLER.

Witnesses:
EMIL PARAVICINI,
AMAND RITTER.